March 12, 1940.  L. MITCHELL-HENRY  2,193,723
REEL FOR FISHING LINES
Filed Aug. 24, 1937   2 Sheets-Sheet 1
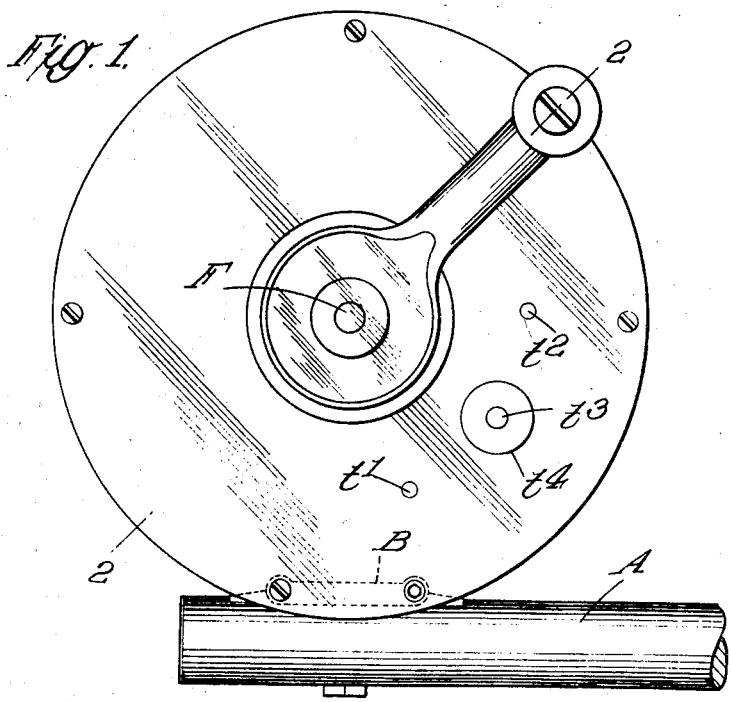
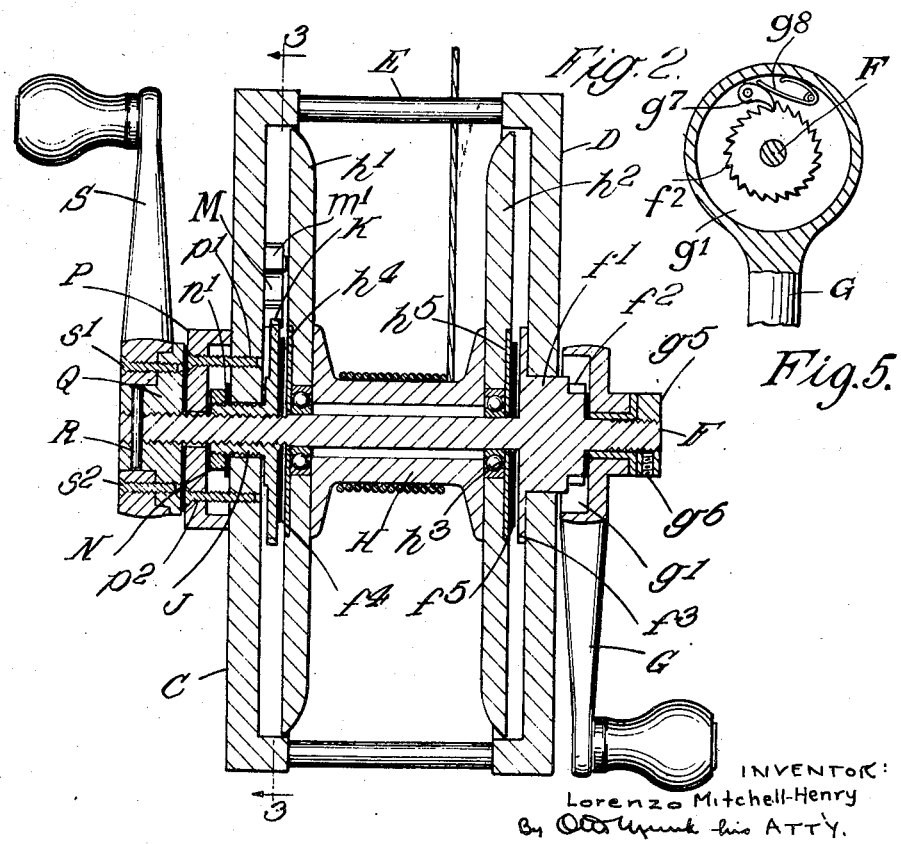
INVENTOR:
Lorenzo Mitchell-Henry
By his ATTY.

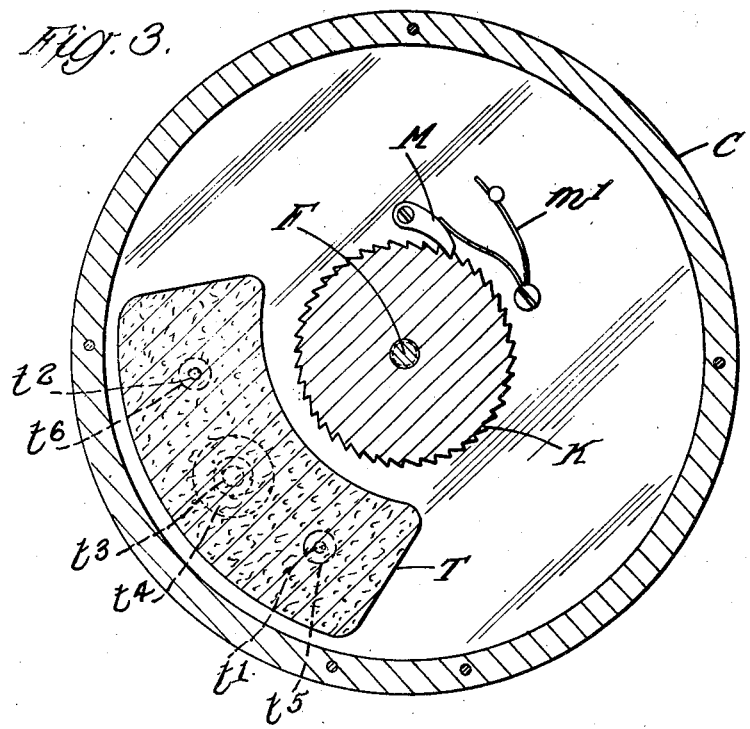
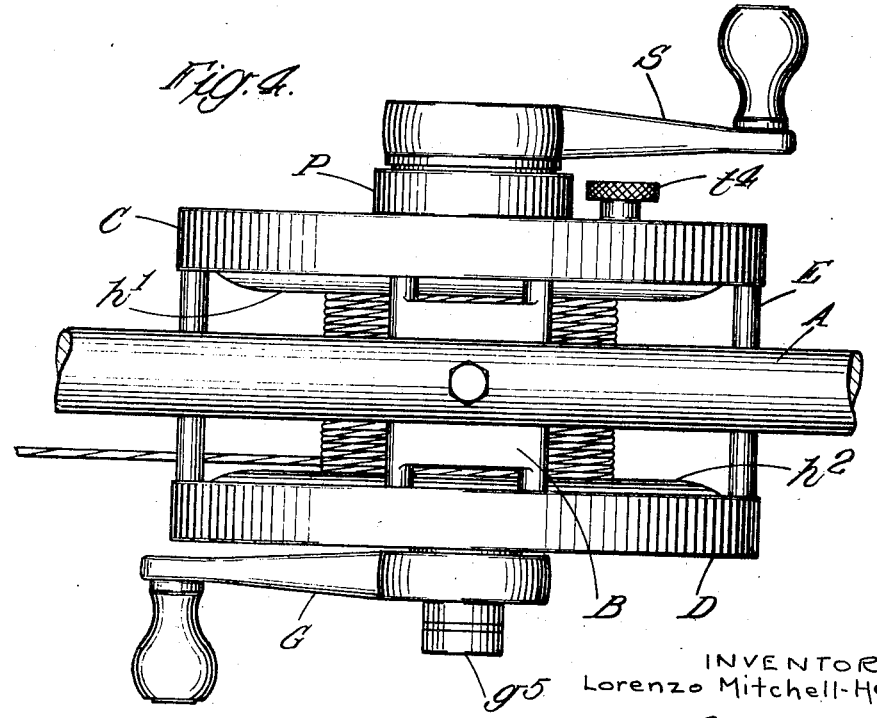

Patented Mar. 12, 1940

2,193,723

UNITED STATES PATENT OFFICE 2,193,723

REEL FOR FISHING LINES

Lorenzo Mitchell-Henry, Ealing, London, England

Application August 24, 1937, Serial No. 160,567
In Great Britain September 2, 1936

7 Claims. (Cl. 242—84.5)

This invention relates to reels for fishing lines.

For many years the majority of reels intended for big game fishing have been fitted with multiplying gear rotated by a handle through a friction clutch which is operated by tightening a nut. The pressure on the line is greatly increased as the diameter of the drum or spool is reduced when the line is drawn off by a fish, often increasing the braking effect to a dangerous degree.

The chief object of the present invention is to produce a reel in which the spool is automatically set free to rotate in the event of the strain on the line becoming greater than the angler desires, but in which at the discretion of the angler it can be held against the pull of the fish without allowing any slip.

Another object is to provide a fishing reel with which it is possible to rotate the spindle supporting the line winding drum or spool in one direction to lock the drum or spool for rotation therewith but on reverse rotation of the spindle and drum frees the latter for free rotation of the spindle.

Yet another object is to provide a reel with which the angler can pay out the line, check the winding out of the line and rewind the line at will, yet which will free the spool should sudden strain be put on the line.

The foregoing and further objects of the invention will become apparent from the description which follows of an embodiment of the reel but I wish it to be understood that I do not limit myself to the particular arrangement described hereinafter and illustrated in the accompanying drawings.

In the drawings:

Figure 1 represents the left side in elevation of a reel in the "fishing-up" or above position on a fishing rod, a portion only of the rod being shown.

Figure 2 represents the reel in section taken on the line 2—2 in Figure 1.

Figure 3 represents a sectional view taken on the line 3—3 in Figure 2.

Figure 4 is a plan of the underside of the reel.

Figure 5 is a section on line 5—5 of Figure 2.

The reel may be located either above the rod as seen in Figures 1 and 4, or below the rod.

A indicates a portion of a fishing rod, to which are connected by a bracket B two side plates C, D, constituting the casing of the reel, these side plates being also connected with each other by distance pieces or pillars E. A spindle F screw-threaded at both ends and plain in the middle passes through the reel, and a spool H having flanges $h'$ $h^2$ runs on ball bearings $h^3$ around the plain part of the spindle F, cover plates $h^4$ $h^5$ let into the outer faces of the flanges covering the ball races. On one end of the spindle F is a boss $f'$ on which are formed ratchet teeth $f^2$ and a handle G freely mounted on this end of the spindle contains a recess $g'$ in which is mounted a pawl $g^7$ impelled by a spring $g^8$ to mesh with the ratchet teeth $f^2$. A lock nut $g^5$ to prevent detachment of the handle is secured by means of a set screw $g^6$. To the boss $f'$ is secured a plate $f^3$ on the inner side of the plate D. On the part of the spindle F which projects beyond the flange $h'$ is the bush or boss J of a ratchet wheel K (see Figure 3) forming an internally threaded bearing for the spindle F, meshing with a detent pawl M which is held in the teeth of the ratchet wheel by a spring $m'$, the pawl being mounted on the recessed inner surface of the reel side plate C. A part of the boss J, which is externally threaded, projects through the side plate C, and outside the said plate C a nut N (see Figure 2) engages the said part of the boss, and can be secured thereon by a set screw. A washer $n'$ is interposed between the nut N and plate C. A brake disc $f^4$ is interposed between the ratchet wheel K and the ball race-cover plate $h^4$ and another brake disc $f^5$ is interposed between the bearing plate $f^3$ and the ball race-cover plate $h^5$. A cup or box P passing freely over the end of the spindle F is placed over the nut N and secured in position by screws $p'$ $p^2$. A nut Q is then placed on the spindle F, and held in position by a pin R passing through the spindle, and an auxiliary handle S may be placed on the nut Q and secured thereto by screws $s'$ $s^2$.

A pad T (see Figure 3) of rough or resilient material is mounted on a segmental plate carried by three studs $t'$ $t^2$ $t^3$ (see Figures 1 and 3) passing through the side plate C of the reel, the studs $t'$ $t^2$ being surrounded by springs $t^5$ and $t^6$ in compression (see Figure 3), which tend to press the pad against the flange $h'$ (Figure 2); the stud $t^3$ (Figures 1 and 3) is a screw the head of which is engaged by a milled nut $t^4$ (Figures 1, 3 and 4) outside the plate C. By the clockwise rotation of the nut $t^4$ the pad T can be drawn closely against the inner surface of the plate C, and by the counter-clockwise rotation of the nut $t^4$ the springs $t^5$ and $t^6$ around the studs $t'$ $t^2$ are permitted to expand and press the pad T against the flange $h'$, thus exerting a braking action on the rotation of the spool H. It will be observed that this braking effect is obtained by means of the springs, and not by pressure exerted on the nut $t^4$.

On revolving the handle G in a clockwise direction the pawl in the recess $g'$ drives the teeth $j^2$ and thereby rotates the spindle F, the teeth of the plate K (Figure 3) running idly past the pawl M, the spindle F (Figure 2) screws itself further into the bearing boss J, rotation of which in the side plate C is resisted by friction between J and C, the distance between the ratchet toothed plate K and the bearing plate $j^3$ being thus contracted, the flanges of the spool are gripped between the two last named members sufficiently to bind the spool and cause it to rotate with the spindle to wind the line on to it. It will thus be seen that the spindle moves axially further into the boss J until sufficient gripping action is effected. The handle S takes part in the rotation, whether power is applied to it or not. Reverse movement of the handle S is partly stopped by the ratchet teeth on the plate K engaging the pawl M, and but slight backward movement of the handle S is sufficient to release the spool when winding pressure has been applied. Upon releasing the handle or handles the tension on the line remains constant and the reel offers a resistance to the line being drawn off proportionate to the pressure exerted in winding it on. For example if the pull on the line, when being drawn off by a fish, is increased by a certain percentage and the handle is not held, the pull of the line turns the spool backwards and causes the screw threaded spindle F to rotate in the boss J; the ratchet wheel K resists the pull, and the spindle F then begins to withdraw from the boss J, causing the cover plate $h^4$ to recede from the wheel K and the bearing plate $j^3$ to recede from the cover plate $h^5$ to the extent permitted by the nut Q on the box P, so that the distance between K and $j^3$ is increased and the spool is set free to rotate, the friction on the boss J and the braking devices $f^4$, and $j^5$, and T giving only the necessary resistance to steady this rotation and prevent the line from over-running and becoming entangled. Further braking effect on the line running out can be obtained by applying winding pressure. When the handle G is turned in the reverse direction the ratchet teeth $f^2$ become ineffective, the pawl in the recess $g'$ running idly over them, and when rotated in the forward, that is, clockwise direction the ratchet wheel drives the spindle to grip the spool between the plates $j^3$ and K. The handle G can also be moved to and fro, thus drawing in the line inch by inch.

The spool is practically self-releasing in that if the angler takes his hand off the handle a very small additional pull by the fish, say 2% more than the resistance due to the tension with which the line has been wound on by the handle, suffices to set the spool free to revolve and allow the line to be drawn off, but as a comparatively greater effort in turning the handle is necessary to overcome a dead weight pull on the line to cause the reel to bind again, in that case an additional pull of about 50% would be necessary to release the spool. When a fish is running out, the angler may continually increase the pressure by winding until the resistance of the spool to unwinding becomes sufficient to hold the fish.

What I claim is:

1. A fishing reel including a pair of opposed plates united to form a casing, a bracket associated with said plates for connection to a fishing rod, a spindle disposed transversely through said plates and mounted for rotation in either direction, a threaded extension on said spindle at one end thereof, a crank rotatably mounted on the other end of said spindle, means for rotating said spindle direct by and in the same direction as the crank in one direction, a plate fast with said spindle, a line-winding drum mounted for free rotation on said spindle within said casing and intermediate said extension and said plate, an internally threaded bearing member for said spindle in threaded engagement with said threaded extension, means to hold said bearing member while the spindle is being rotated to draw said threaded extension further into it to clamp the drum, and means to hold said bearing member while the spindle is being rotated in the reverse direction to unclamp the drum.

2. A fishing reel including a pair of opposed plates united to form a casing, a bracket associated with said plates for connection to a fishing rod, a spindle disposed transversely through said plates and mounted for rotation in either direction, a threaded extension on said spindle at one end thereof, a crank rotatably mounted on the other end of said spindle, means comprising a ratchet and pawl connected with said crank and spindle for rotating said spindle by said crank in one direction, a plate fast with said spindle, a line-winding drum mounted for free rotation on said spindle within said casing and intermediate said extension and said plate, an internally threaded bearing member for said spindle provided with ratchet teeth in threaded engagement with said threaded extension, friction means to resist said bearing member from rotating while the spindle is being rotated to draw said threaded extension further into it to clamp the drum, and a pawl engaging the ratchet teeth of said bearing member to prevent its rotation while the spindle is being rotated in the reverse direction to unclamp the drum.

3. A fishing reel including a pair of opposed plate members united in spaced relation to form a casing, means for securing the casing to a fishing rod, a spindle disposed transversely through the plates and mounted for free rotation therein in either direction, a threaded extension at one end of said spindle extending beyond one of said plates, a first crank handle rotatably mounted on one end of the spindle, means comprising a ratchet and pawl connected with said crank and spindle for rotating said spindle by said crank in one direction, a second crank handle fixed on the other end of said spindle for rotating the spindle in either direction, a drum mounted for free rotation on said spindle and disposed within said casing, a first disk mounted for permanent rotation with the spindle and disposed on one side of the drum, a bearing member for said spindle in threaded engagement with said threaded extension, a second disk provided with ratchet teeth attached to and forming part of said bearing member disposed on the other side of said drum, friction means to resist rotation of said second disk while the spindle is being rotated to draw said threaded extension further into it to clamp the drum, and a pawl engaging the ratchet teeth of the second disk to hold the latter against rotation while the spindle is being rotated in the reverse direction to unclamp the drum.

4. A fishing reel comprising a pair of opposed plates united in spaced relation to form a casing, a bracket associated with said plates, a spindle disposed transversely through said plates and mounted therein for rotation in either direction and for movement longitudinally along its axis, means for limiting the extent of such longitudinal movement, a threaded extension on said spindle at one end thereof, driving means rotatably mounted direct on said spindle, means comprising a ratchet and pawl connected with said driving means and spindle for rotating said spindle by said driving means in one direction, a plate fast with said spindle, a line-winding drum mounted for free rotation on said spindle within said casing, an internally threaded bearing member for said spindle in threaded engagement with said threaded extension, friction means to resist said bearing member from rotating while the spindle is being rotated to draw said threaded extension further into it to clamp the drum, and means for holding said bearing member against rotation while the spindle is being rotated in the reverse direction to unclamp the drum.

5. A fishing reel including a pair of opposed plate members united in spaced relation to form a cage, a bracket on said cage, a spindle disposed transversely through the plates and mounted for free rotation in either direction, a threaded extension at one end of said spindle extending beyond one of said plates, driving means rotatably mounted direct on the other end of said spindle, means comprising a ratchet and pawl connected with said driving means and spindle for rotating said spindle by said driving means in one direction, a drum mounted for free rotation on said spindle and disposed within said cage, a first disk mounted for permanent rotation with the spindle and disposed on one side of the drum, a bearing member for said spindle mounted on and having one end projecting through one of the plates of said cage said bearing member being in threaded engagement with said threaded extension, a second disk forming part of said bearing member, means to resist rotation of said second disk while the spindle is being rotated to draw said threaded extension further into it to clamp the drum, means to hold said second disk against rotation while the spindle is being rotated in the reverse direction to unclamp the drum, a nut on said projecting end of said bearing member, a box secured to the outside of said cage—covering said nut and having an aperture through which the said threaded extension of the spindle passes, and a nut secured on said spindle outside said box to limit the longitudinal movement of said spindle while said threaded extension is being rotated in the reverse direction to unclamp the drum.

6. In a fishing reel, a frame, a spindle having a threaded extension rotatably mounted in said frame, a drum rotatably mounted on said spindle, a plate fast with said spindle on one side of said drum, an internally threaded bearing member for said spindle in threaded engagement with said threaded extension on the other side of said drum, means for operating said spindle, means for resisting rotation of said bearing member while the spindle is being rotated to draw said threaded extension further into it and moved longitudinally to clamp the drum, and means for preventing rotation of said bearing member while the spindle is being rotated in the reverse direction and moved longitudinally to unclamp the drum.

7. In a fishing reel, a frame, a spindle having a threaded extension rotatably mounted in said frame, a drum rotatably mounted on said spindle, a plate fast with said spindle on one side of said drum, an internally threaded bearing member for said spindle in threaded engagement with said threaded extension on the other side of said drum, means for operating said spindle, means for resisting rotation of said bearing member while the spindle is being rotated to draw said threaded extension further into it and moved longitudinally to clamp the drum, means for preventing rotation of said bearing member while the spindle is being rotated in the reverse direction and moved longitudinally to unclamp the drum, and means for limiting the longitudinal movement of the spinde.

LORENZO MITCHELL-HENRY.